(12) United States Patent
Raymond et al.

(10) Patent No.: US 6,515,827 B1
(45) Date of Patent: Feb. 4, 2003

(54) DUAL CHAMBERED ENVIRONMENTALLY CONTROLLED CARTRIDGE AND METHOD FOR PROTECTING DATA STORAGE MEDIA

(75) Inventors: Robert M. Raymond, Boulder, CO (US); Michael L. Leonhardt, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/347,908

(22) Filed: Jul. 8, 1999

(51) Int. Cl.[7] .................... G11B 23/027; G11B 33/14
(52) U.S. Cl. ................. 360/132; 242/347.1; 242/348.2
(58) Field of Search .................... 360/132, 133; 242/348.2, 348, 347.2, 347.1, 341

(56) References Cited

U.S. PATENT DOCUMENTS

| | | | |
|---|---|---|---|
| 3,569,637 A | * 3/1971 | Esten | |
| 3,692,956 A | * 9/1972 | Northrup | |
| 4,620,248 A | 10/1986 | Gitzendamner | |
| 4,812,936 A | 3/1989 | Satoh et al. ................. | 360/132 |
| 4,863,499 A | 9/1989 | Osendorf | |
| 5,023,739 A | 6/1991 | Shinohara et al. .......... | 360/132 |
| 5,189,581 A | 2/1993 | Schroder et al. ............ | 360/137 |
| 5,392,177 A | 2/1995 | Chalmer et al. | |
| 5,453,897 A | 9/1995 | Bakerman ................... | 360/132 |
| 5,602,903 A | 2/1997 | LeBlanc et al. | |
| 5,651,171 A | 7/1997 | Nelson ........................ | 29/460 |
| 5,691,860 A | 11/1997 | Hoppe ........................ | 360/133 |

FOREIGN PATENT DOCUMENTS

| | | |
|---|---|---|
| FR | 2 674 980 | 10/1992 |
| JP | 57 050339 | 3/1982 |
| JP | 57 055572 | 4/1982 |
| JP | 58 098886 | 6/1983 |
| JP | 58 102373 | 6/1983 |
| JP | 58 133678 | 8/1983 |
| JP | 59-022274 | * 2/1984 |
| JP | 60-147983 | * 8/1985 |
| WO | WO 91/08570 | 6/1991 |

OTHER PUBLICATIONS

Bharat Bhushan et al, Tribology in Ultra–High Density Tape Drive Systems: State of the Art and Future Challenges, IEEE Transactions on Magnetics, vol. 34, No. 4, Jul. 1998, pp. 1883–1888.

Steven T. Patton et al., Environmental Effects on the Streaming Mode Performance of Metal Evaporated and Metal Particle Tapes, IEEE Transactions on Magnetics on Magnetics, vol. 33, No. 4, Jul. 1997, pp. 2513–2530.

John W. C. Van Bogart, Magnetic Tape Storage and Handling, National Media Laboratory, Jun. 1995, pp. 1–2.

John W. C. Van Bogart, Magnetic Tape Storage and Handling, National Media Laboratory, 5. How can you Prevent Magnetic Tape from Degrading Prematurely?, National Media Laboratory, Jun. 1995, pp. 1–10.

Recommended Storage Conditions for Magnetic Tape, p. 1, Sep. 1997.

* cited by examiner

*Primary Examiner*—Craig A. Renner
(74) *Attorney, Agent, or Firm*—Brooks & Kushman P.C.

(57) ABSTRACT

An environmentally controlled cartridge and method for protecting data storage media from disallowed humidity levels and contaminants. The cartridge has a first chamber and a second chamber. The first chamber is operative to contain the data storage media and is openable to the ambient environment to provide drive access to the media. A charged desiccant is disposed in communication with the second chamber and may further include a pollutant getter. The second chamber is in selective communication with the first chamber.

41 Claims, 3 Drawing Sheets

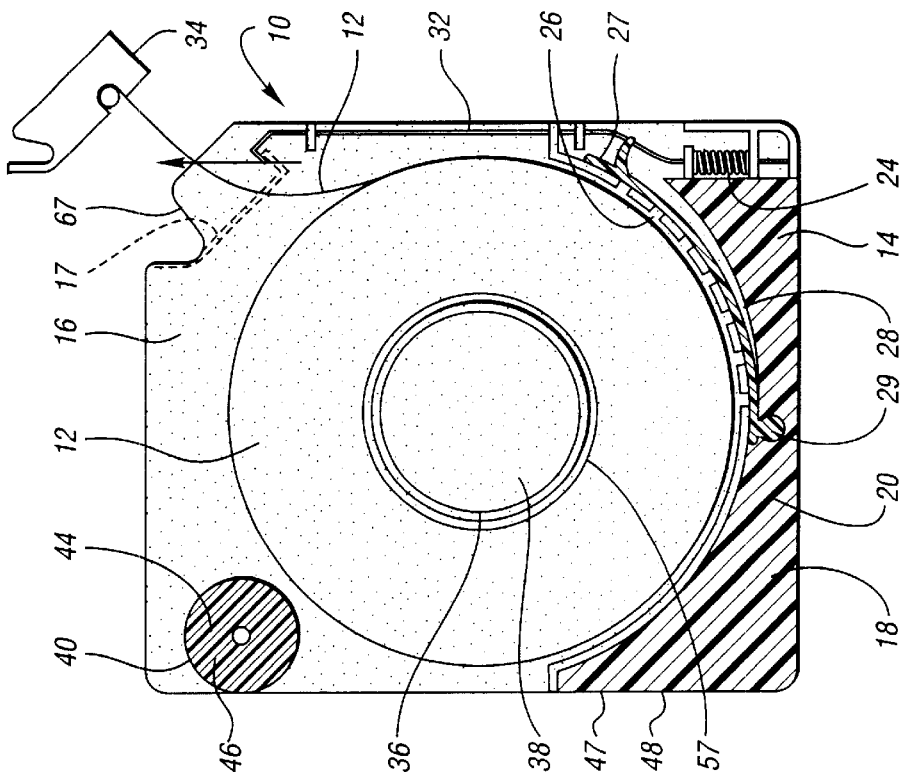
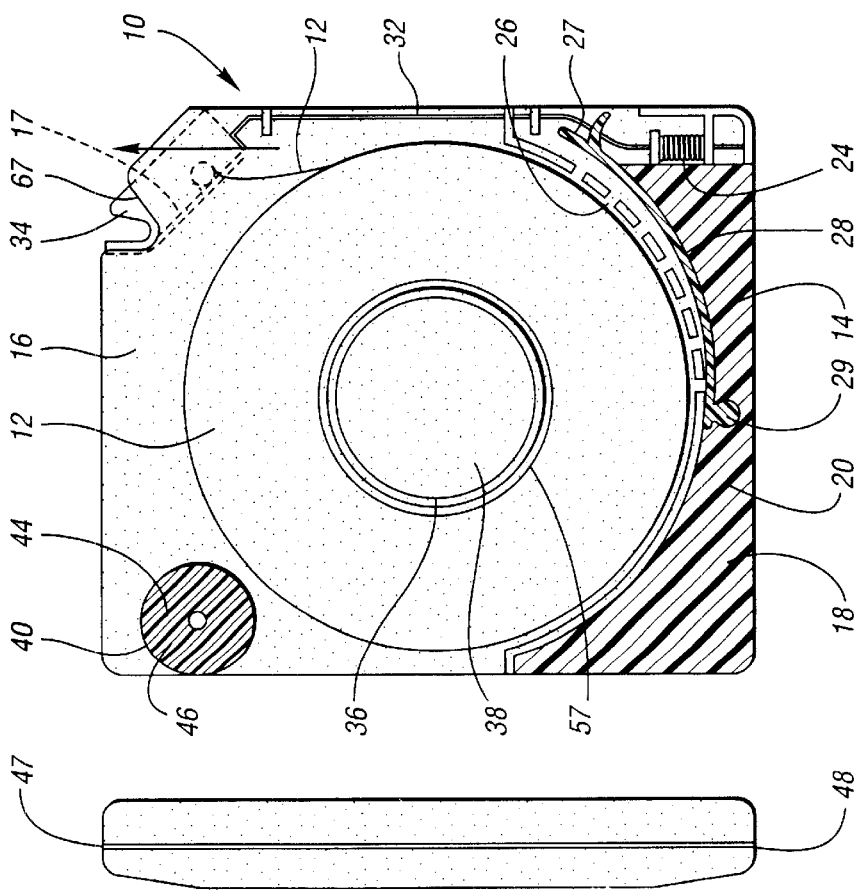

B. Bhushan, S. Patton, "Tribology in Ultra High Density Tape Drive Systems: State of the Art and Future Challenges", IEEE Transactions on Magnetics vol. 34, no. 4, pg. 1883-1888, July 1998. "Environmental Effects on the Streaming Mode Performance of Metal Evaporated and Metal Particle tapes" vol.33, pg. 2513-2530, 1997

DUAL CHAMBERED ENVIRONMENTALLY CONTROLLED CARTRIDGE AND METHOD FOR PROTECTING DATA STORAGE MEDIA

TECHNICAL FIELD

This invention relates to an environmentally controlled cartridge for protecting data storage media therein and to a method for controlling the internal cartridge environment.

BACKGROUND ART

Many organizations have long term data storage requirements. Typically, these requirements are addressed by storing important data on media such as magnetic tapes. As those skilled in the art will recognize, however, functional lifetimes of magnetic tape as well as other types of data storage media (disk, tape, optical, magnetic, etc.) are highly sensitive to environmental conditions and, in particular, humidity, airborne pollutants and particulates.

The lifetime of data storage media is generally defined as the length of time it may be archived until data can no longer be read back at the originally specified performance levels. For example, properly manufactured metal particle (MP) tapes operated and stored under controlled conditions can have a life expectancy exceeding 50 years. Such conditions require, however, low controlled humidity on the order of 20–30%. With moderate humidity (50%), the functional lifetime of an MP tape can be reduced to two years. But with elevated humidity (80%) the lifetime can be reduced to one month or less. Typical failure modes include hydrolytic degradation of the binder ("sticky tape"), reductions in binder adhesion, irreversible substrate shrinkage and loss of magnetic remanence or coercivity (signal loss).

In a further example, FIG. 6 illustrates the relationship between humidity and temperature and the resultant effects on the stability and life of Metal Evaporated (ME) tapes. As shown therein, with temperatures in the approximate range of 16° C. to 32° C., humidity strongly influences the lifetime of the media. With an elevated specific humidity (i.e. >0.013), tape instability is experienced. With a moderate level of specific humidity (i.e. 0.08>x>0.013), the optimum operating environment is achieved. Where the specific humidity levels are less than 0.08, high tape wear and low output is experienced. Metal Evaporated (ME) type media has an optimal environmental operating zone requiring a moderate humidity from 40–70% (specific humidity, 0.08>x>0.013).

In the case of the specific humidity requirements of magnetic tapes, the primary options for users to ensure long term data integrity and reliable tape operation have heretofore been to use environmentally controlled tape storage vaults, frequent replacement of tapes or migration of data to new media types. Regardless of the approach, preservation of stored data requires regular media sampling and migration procedures. It is not unusual for large data storage users to perform data migration and/or tape replacement every 3–5 years to insure the integrity of their data; such procedures are costly and can be disruptive to operations.

Humidity is also known to affect magnetic disk media operation as well. For example, the tribology between the head and disk is significantly affected by the relative humidity of the disk/head environment. In broad terms, a very low relative humidity results in poor start-stop tribology and therefore poor reliability. On the other hand, excessive relative humidity contributes to excessive sticking force, when the head is stationary on the disk. Excessive sticking force results in possibly damage to head or suspension components. These problems have motivated the development of environmental control schemes for fixed disk (sealed) magnetic disk drives.

Examples of magnetic disk drive environmental controls are shown in U.S. Pat. No. 4,620,248 issued to Gitzendanner and U.S. Pat. No. 4,863,499 issued to Osendorf. In these patents, the environment of a sealed magnetic disk drive is humidity controlled by utilizing a desiccant. The ingestion of airborne contaminants and particulates during the disk drive's temperature and elevation cycling is minimized by incorporating filter and getter functions into a breather assembly. Unlike the disk media within a sealed disk drive, data storage media such as magnetic tape is exposed to the outside environment during every use. Although this media is housed within a cartridge, the cartridge is opened to permit the drive's access to the media. In addition, the cartridge due to its design does not environmentally protect the tape when removed from the drive.

Consequently, a need has developed for an environmentally controlled data storage media cartridge and a method of controlling the internal environment of the cartridge.

DISCLOSURE OF INVENTION

It is a principal object of the present invention to control the humidity levels inside a cartridge for an extended period of time by providing a system which selectively exposes a charged desiccant to data storage media in response to the insertion and removal of the cartridge from a drive.

It is also an objective of the invention to seal the cartridge to reduce external-to-internal/internal-to-external air leakage rates to an acceptable level consistent with the desired life of the charged desiccant.

It is another objective of the invention to balance air pressure between the inside of the closed cartridge and the external environment to protect the integrity of the aforementioned seal over temperature and air pressure variations.

It is yet another object of the invention to provide a cartridge structure and method to maintain an internal cartridge environment free of chemical and particulate pollutants for the data storage media in the cartridge.

It is still another object of the invention to increase the lifetime of desiccant inside a variety of cartridges.

It is yet another object of the invention to selectively expose media to desiccant that is stored within the cartridge.

In carrying out the above objects and other objects and features, an environmentally controlled cartridge for protecting data storage media from disallowed humidity levels, airborne chemical contaminants and particulate levels is provided. The cartridge includes a first chamber that is normally sealed but openable to ambient and adapted to contain data storage media; a second chamber adapted to communicate with means to control moisture and chemical pollutants in the first chamber; and means to communicate between the first chamber and the second chamber when the first chamber is open to the ambient environment.

In a preferred embodiment, the communication means comprises an opening between the first and second chambers and the humidity control means and/or chemical pollutant getter means that are in communication with and preferably, but not necessarily, disposed inside of the second chamber. A seal is moveably affixable to the opening of the second chamber. An actuator is connected to the seal to close the second chamber's opening when the first chamber is open. When the cartridge is inserted into a compatible drive and media access is required, the first chamber is opened. Depending upon the specific cartridge requirements, the first chamber's sealable opening element may consist of a pivoting, sliding, rotating, removable section or the like. The seal actuator links the opening element of the first chamber to the seal of the second. Alternatively, the seal actuator links cartridge insertion detection means (independent of the opening elements of the first chamber) and the second chamber seal. A breather opening is provided in the exterior wall of the first chamber. While the cartridge is sealed, desiccant is exposed to the data storage media and internal cartridge air in order to maintain required humidity levels. Likewise, the pollutant getter material is exposed the data storage media and the internal cartridge air for the purpose of absorbing airborne chemical pollutants.

The second chamber's moveably affixable seal may utilize a variety of methods to efficiently allow for the air exchange between the first chamber and the second when the seal is open. Embodiments can include the use of pivoting, sliding or rotating elements—all with linkages to the first chamber's sealable opening to selectively seal the chambers from one another. In the closed position, the seal functions to prevent the flow of air between the chambers.

In a preferred embodiment, the breather may comprise a breather filter affixable to the breather opening to prevent particulates from entering the cartridge, and a pollutant getter also affixable to the breather opening to trap airborne chemical pollutants and prevent them from entering the cartridge. This breather is one component of the entire cartridge system which controls the interior environment of the cartridge. The breather opening is of an area and length to maintain a balance in pressure between the interior and exterior of the cartridge while preventing the passage of moist air into or out of the cartridge. The breather thereby protects the integrity of the cartridge seals without compromising the effectiveness of the desiccant. The particulars of breather design are well known in the art.

Also in a preferred embodiment, the cartridge for protecting data storage media may include a cartridge having exterior walls about a first chamber openable to the ambient environment and adapted to contain data storage media and a second chamber having an opening to the first chamber; a pollutant getter disposed inside of the second chamber; a charged desiccant disposed within the second chamber, the charged desiccant operative to provide a constant humidity level for the internal cartridge air; a seal moveably affixable to the opening of the second chamber; an actuator connected to the seal; a breather; a breather filter; a breather pollutant getter; and cartridge seal(s) disposed around openings in the first chamber used by the drive to gain access to the media as well as between the individual components of the cartridge case itself. Taken together, these seals serve to reduce the flow of air between the external environment and the internal cartridge environment to low levels.

A method is also provided for maintaining a predetermined humidity level inside a cartridge for use in a data storage drive. This method includes: inserting the cartridge into a drive; engaging the media by opening the seal(s) of the first chamber and establishing mechanical, electrical, magnetic or optical connections with the media; actuating the linkage from the first chamber's opening elements or a cartridge insertion detection alternative and using that actuation to engage the second chamber's seal to close the opening of the second chamber and to protect the desiccant and pollutant getter from exposure to ambient; operating the drive; withdrawing the drive's media connections; closing the first chamber from the ambient environment; triggering the actuator connected to the second chamber seal; and opening the second chamber to expose the data storage media to the desiccant and pollutant getter.

In an alternative embodiment, a method is provided to control the inside environment of a cartridge for protecting data storage media therein from a contaminant in the outside environment. The contaminant may include chemical pollutant, particulate or humidity levels outside the predetermined requirements of the media. As those skilled in the art will recognize, the contaminant may be either a chemical pollutant, particulate, or humidity or any combination thereof. This method includes: providing a closed cartridge with a first chamber for the data storage media and with a second chamber for material to control the contaminants in the inside environment in addition to openable closures for respectively selectively opening and closing the first chamber to ambient and the second chamber to the first chamber; opening at least one closure for connecting the first chamber to the ambient environment while accessing the data storage media; and opening at least one other closure when the one closure is closed to decontaminate the inside environment of any contaminant which entered the first chamber at least when the first chamber was open to ambient.

As those skilled in the art will recognize, the embodiments of this invention can vary depending upon the specific requirements of the data storage media, and the drive that operates upon the media. Accordingly, the particular size, shape and form of the cartridge, its chambers, seals, actuator, breather, desiccant, pollutant getters and the like may vary, depending on the particular application.

The above objects and other objects, features, and advantages of the present invention are more readily understood from a review of the attached drawings and the accompanying specification and claims.

BRIEF DESCRIPTION OF DRAWINGS

FIG. 1 is a schematic top cross-section view of a first embodiment of the environmentally controlled cartridge of this invention in an open position of its second chamber seal;

FIG. 2 illustrates the side view of a first embodiment of the environmentally controlled cartridge;

FIG. 3 is a schematic top cross-section view, partially exploded, of a first embodiment of the environmentally controlled cartridge of this invention in a closed position of its second chamber seal;

BEST MODES FOR CARRYING OUT THE INVENTION

Figure 5:
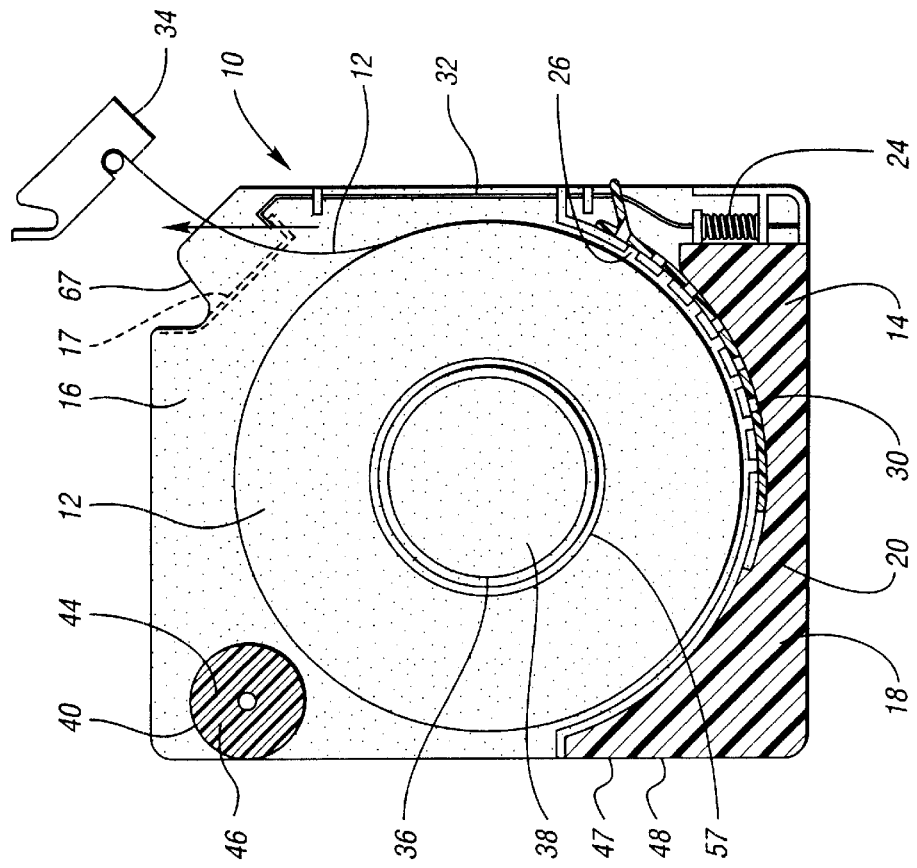
FIGS. 4 and 5 are schematic top cross-section view of the environmentally controlled cartridge of this invention with a second embodiment of its second chamber seal in open and closed positions, respectively.

With reference to FIGS. 1 and 2 of the drawings, a schematic top cross-section view and a side view are illustrated. The present invention controls the local environment inside a cartridge 10 by use of humidity control means and/or chemical pollutant control means such as for example charged (water content) desiccant 14 and airborne pollutant getter 20. The cartridge 10 is preferably, but not necessarily, of a standard "IBM 3480 form factor type" containing magnetic tape media 12 within a first chamber 16.

In keeping with the invention, charged desiccant 14 provides a substantially constant humidity level within a second chamber 18. Cartridge seals 17, 36 and 47 restrict the flow of air into and out of the closed cartridge 10. The seals are located at the hub opening 57, the leader block opening 67 and the upper and lower cartridge shell half seam 48 (around the outer perimeter of the cartridge). The design of such seals is well known in the art but must utilize non-contaminating materials. The airborne pollutant getter material 20, utilizes activated charcoal or other suitable material to trap airborne chemical pollutants within the cartridge 10 away from the tape media 12. A second chamber seal system 26, 27, 28, 29 controls the air flow between first chamber 16 and second chamber 18 to protect the desiccant 14 and pollutant getter 20 from the outside environment when the cartridge 10 is open for media access. Media access is accomplished when the cartridge 10 is loaded into a compatible tape drive (not shown) that unlatches leader block 34 onto which the end of the tape media 12 is affixed. The drive loading process also engages hub 38 that opens seal 36 to allow hub 38 and tape pack 12 to rotate in response to the tape drive's mechanism. A breather 40 balances air pressures between inside and outside the closed cartridge 10 (typically from temperature and barometric pressure variations) to prevent a breach of the cartridge seals 17, 36 and 47; a breather filter 44 prevents particulates from entering the cartridge 10; and a second pollutant getter 46 also utilizing activated charcoal or other suitable material traps pollutants that would otherwise enter cartridge 10.

Desiccant 14, with a pre-charged amount of water, controls humidity, thereby enhancing tape life time and tape handling. The desiccant 14 may consist of silica gel, calcium aluminosilicate clay, crystalline metal aluminosilicates, or any suitable material depending on the application. However, silica gel is the preferred material for this embodiment's desired humidity levels. Depending upon the configuration of the second chamber 18, the desiccant 14 may be mixed with the pollutant getter 20 or the desiccant 14 may be separated from the pollutant getter 20 within the second chamber 18. These materials may be housed within a secondary container (fitting within second chamber 18), itself partitioned into one or more chambers but in all instances allowing full airflow within and without its structure to optimize contact of the internal cartridge atmosphere with the desiccant and pollutant getter materials while cartridge 10 is closed and the environmental control seal is open. The desiccant 14 and pollutant getter 20 materials themselves may be in particle or solid form. They may also be molded into any desired shape such as one to fit the contours of second chamber 18. In all cases, means are provided to contain the materials and any by-products of the materials within the second chamber 18. These means are a part of the secondary container and utilize an air permeable, non-contaminating material.

The table below illustrates how much silica gel must be in an IBM 3480 form factor type cartridge under worst case conditions for 25 years of humidity control under various leakage rates. The highest leakage rate consistent with a reasonable amount of silica gel ($^-22\%$ of the cartridge volume) is 1.0E-4 cc/sec. To employ the present invention in this tape cartridge environment, the cartridge 10 must have a sealed leakage rate of air into or out of the cartridge of less than 1.0E-4 cc/sec; this leakage rate is reasonably achieved since 1.0E-06 cc/sec is associated with "tightly sealed" systems and magnetic disk drives (sealed, with fixed media) achieve better than 1.0E-08 cc/sec.

Number of years = 25
Dry air density g/cc = 0.0012
RH inside the cartridge = 20%
RH outside the cartridge = 80%
Control RH inside to = 20% ± 10%
Density of silica gel g/cc = 0.75
Temperature Degrees C = 30

| Leakage Rate (cc/sec) | Grams of Air | Grams of Water | Volume of Silica Gel (cc) | Silica % of 3480 cart. Vol. |
|---|---|---|---|---|
| 1.00E-06 | 9.46E-01 | 1.42E-02 | 3.38E-01 | 0.22% |
| 1.00E-05 | 9.46E+00 | 1.42E-01 | 3.38E+00 | 2.18% |
| 1.00E-04 | 9.46E+01 | 1.42E+00 | 3.38E+01 | 21.79% |
| 1.00E-03 | 9.46E+02 | 1.42E+01 | 3.38E+02 | 217.95% |
| 1.00E-02 | 9.46E+03 | 1.42E+02 | 3.38E+03 | 2179.49% |

When the cartridge 10 is open and the data storage media is in use, the desiccant 14 and pollutant getter 20 must be protected from the outside environment. It can not be guaranteed that the desiccant 14 will not either absorb or lose too much water during these exposures. Similarly, the ability of pollutant getter 20 to absorb pollutants must be protected. The second chamber seal closes the air flow between the first chamber 16 and the second chamber 18 housing the desiccant 14 and pollutant getter 20 whenever the media is in a drive.

The breather 40 must have sufficient air flow to protect the cartridge seals 17,36 and 47 but a long enough diffusion length to prevent moist air entry into/exit from the cartridge 10 consistent with a <1.0E-04 cc/sec leakage rate Included in the breather assembly 40 is a filter 44 and a pollutant getter 46. Specific breather assembly designs are well known in the art.

The components of this invention work together to selectively expose the magnetic media 12 to the desiccant 14 and pollutant getter 20. The cartridge 10 may be a molded plastic box, which defines a first chamber 16, and a second chamber 18. The first chamber 16 maintains and handles the magnetic media 12 and is openable to ambient by a leader block 34 which is removed after the cartridge 10 is inserted into a tape drive (not shown) when the magnetic media 12 is to be written or read. The leader block 34 has a seal 17 thereabout that seals the first chamber 16 from the ambient atmosphere when the cartridge 10 is not in the drive. As the leader block 34 is removed, the actuator 32 connected between the leader block 34 and seal 28, triggers or biases the seal 28 by means of a spring 24 to close the openings 26 between the second chamber 18 and the first chamber 16.

The second chamber 18 maintains and contains the desiccant 14 and pollutant getter 20. Desiccant 14 and the pollutant getter 20 are exposed to the magnetic media 12 when the cartridge 10 is not being operated in a tape drive. In these circumstances, the first chamber 16 is closed to ambient since the leader block 34 and seal 17 forms a seal to air leakage. The desiccant 14 is exposed to the magnetic media 12 in order to absorb or out-gas moisture and maintain required humidity levels. The pollutant getter 20, which is stored in the second chamber 18, is used to absorb chemical pollutants from the internal cartridge air. As noted, the desiccant 14 and the pollutant getter 20 may be mixed together within the second chamber 18, or the desiccant 14 and the pollutant getter 20 may be separately stored within the second chamber 18.

In the embodiment shown in FIGS. 1 and 3, the actuator 32 moves one end 27 of the seal 28 such that the seal 28 pivots about an axis 29 to open the second chamber 18 to the first chamber 16 thereby exposing the desiccant 14 and pollutant getter 20 to the atmosphere in the first chamber 16. Such exposure controls the inside environment of the cartridge 10 for protecting the magnetic media 12 by controlling the humidity and pollutant levels.

In order to further control the air flow into the first chamber 16 of the cartridge 10, a cartridge seal 36 surrounds the cartridge hub 38 within opening 57 and the seal 47 seals the cavity 48 between the two halves of the container body. The breather 40, in the exterior wall of the first chamber 16, allows air to pass through and balances the pressure between the outside and inside of the cartridge 10. The breather 40 further includes a breather filter 44 preventing foreign particles from entering the cartridge 10 and an activated charcoal getter 46 which prevents chemical pollutants from entering the cartridge 10.

Figure 4:
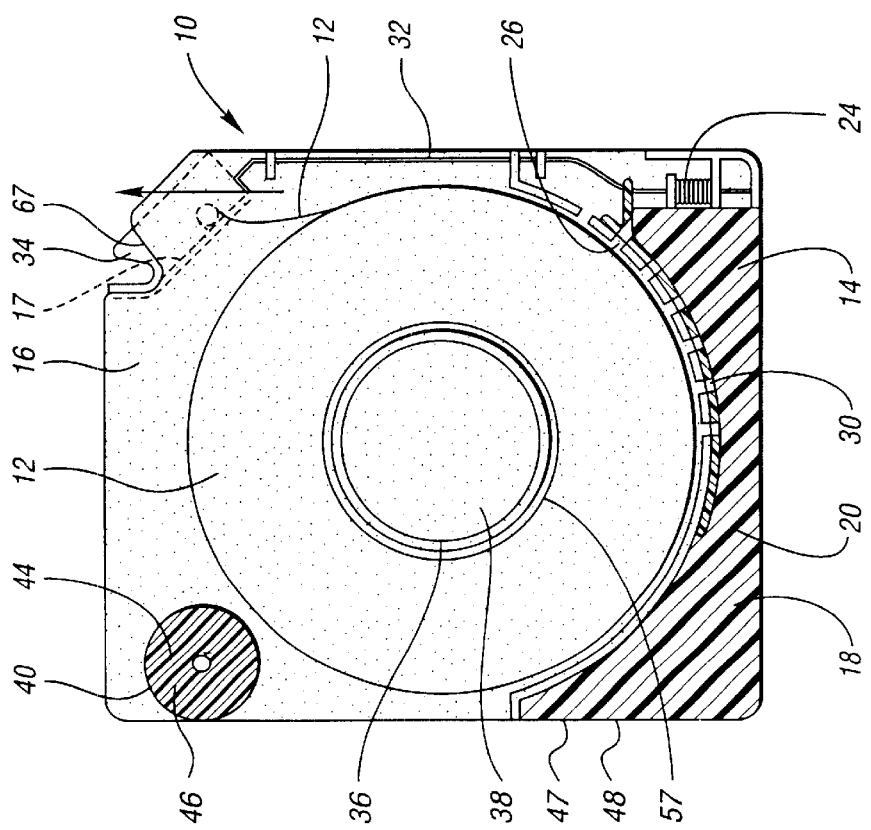
Figure 6:
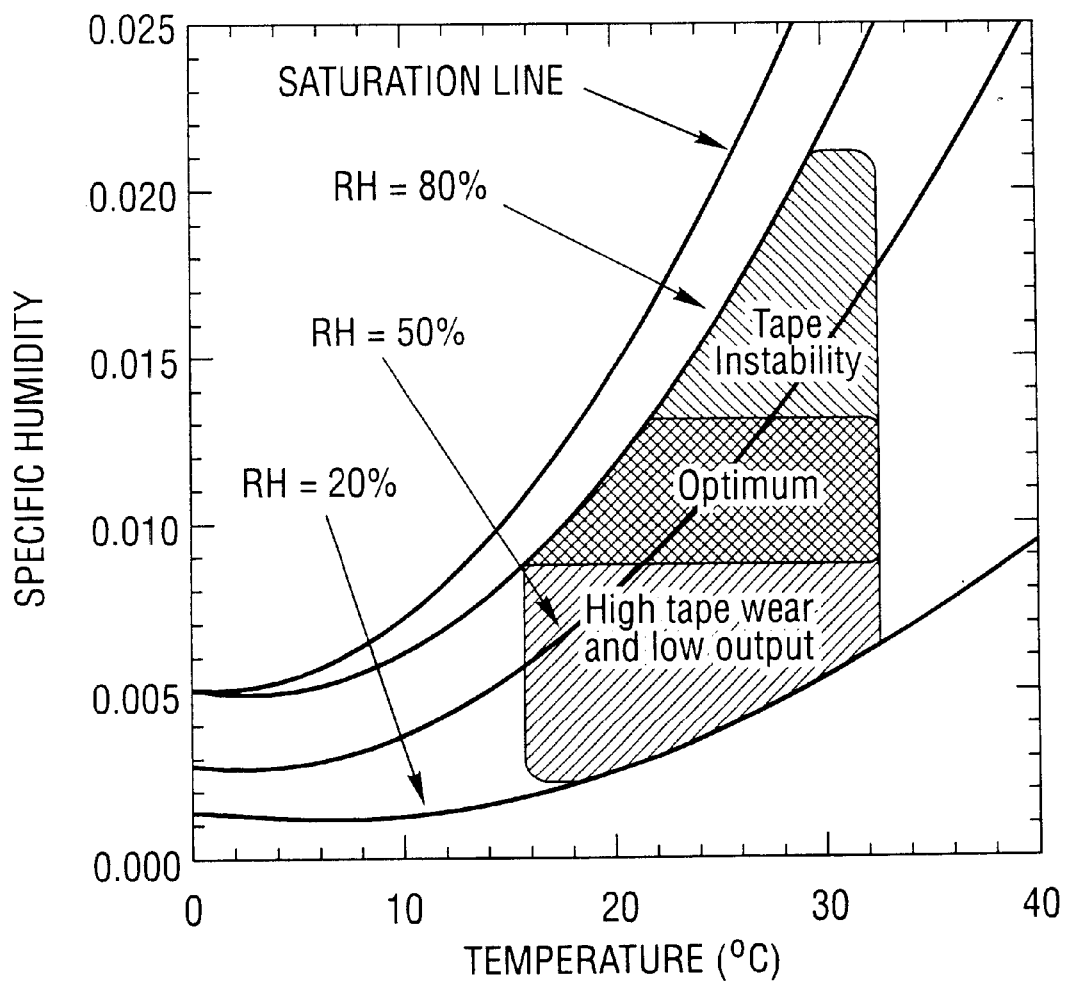
FIG. 6 is a graph illustrating the effects of humidity upon Metal Evaporated (ME) magnetic tape media.

With reference to FIGS. 4 and 5, an alternative second chamber seal embodiment is illustrated. Seal 30, which is moveably affixable to the openings 26 of the second chamber 18, is a sliding door. In FIG. 4, the cartridge 10 is shown sealed. Seal 30 is in a first position such that holes in its structure line up with the openings 26 and permit airflow between first chamber 16 and second chamber 18. In FIG. 5, after the cartridge 10 is inserted into the drive and the leader block 34 is removed, actuator 32 moves upward, biased by spring means 24. Actuator 32 is linked to seal 30 and moves seal 30 to a second position. In this second position, the holes in seal 30 no longer align with the openings 26 resulting in the second chamber being closed to prevent air flow between the first chamber 16 and the second chamber 18. Upon removing the cartridge 10 from the drive, the leader block 34 reseats against seal 17, hub 38 reseats against seal 36 around opening 57, seal 30 is restored to its first position opening air flow between the first and second chambers and the cartridge 10 is sealed against the external environment.

While the best modes for carrying out the invention have been described in detail, those familiar with the art to which this invention relates will recognize various alternative designs and embodiments for practicing the invention as defined by the following claims. Rather, the words used in the specification are words of description rather than limitation, and it is understood that various changes may be made without departing from the spirit and scope of the invention.

What is claimed is:

1. An environmentally controlled cartridge for protecting data storage media therein from disallowed humidity, chemical pollutant and particulate contaminant levels, comprising:

a closed cartridge structure having a first chamber openable for data storage media access and a second chamber having an opening in communication with the first chamber;

a pollutant getter in communication with the second chamber to trap chemical pollutants out of air within the cartridge;

a charged desiccant in communication with the second chamber to control the humidity level inside the closed cartridge structure;

a seal moveably affixable with respect to the opening of the second chamber, and operative to close the communication of the second chamber with the first chamber when the first chamber of the cartridge is open for data storage media access so that the charged desiccant is protected from the environment outside the cartridge; and an actuator connected to the seal for moving the seal to open the communication of the second chamber with the first chamber when the first chamber is not open for data storage media access.

2. The environmentally controlled cartridge as recited in claim 1, wherein the desiccant is selected from the group consisting of silica gel, calcium aluminosilicate clay, and crystalline metal aluminosilicates.

3. The environmentally controlled cartridge as recited in claim 1, wherein the pollutant getter is activated charcoal.

4. The environmentally controlled cartridge as recited in claim 1, wherein the data storage media is magnetic tape.

5. The environmentally controlled cartridge as recited in claim 1, wherein the desiccant and the pollutant getter are combined and disposed in the second chamber.

6. The environmentally controlled cartridge as recited in claim 1, wherein the pollutant getter is disposed inside of the second chamber to trap chemical pollutants out of the air within the cartridge.

7. The environmentally controlled cartridge as recited in claim 1, wherein the charged desiccant is disposed inside of the second chamber to control the humidity level inside the closed cartridge structure.

8. The environmentally controlled cartridge as recited in claim 1, wherein the seal of the second chamber is actuated by a linkage to drive access elements within the first chamber.

9. The environmentally controlled cartridge as in claim 1, wherein the seal of the second chamber is actuated by a linkage to a cartridge insertion detection means.

10. The environmentally controlled cartridge as recited in claim 1, wherein the seal of the second chamber has a first position that optimizes airflow with the first chamber.

11. The environmentally controlled cartridge as recited in claim 1, wherein the seal of the second chamber has a second position that optimizes the restriction of airflow with the first chamber.

12. The environmentally controlled cartridge as recited in claim 1, wherein the actuator further includes a bias-return spring means.

13. The environmentally controlled cartridge as recited in claim 1, further comprising a breather in the exterior wall of the cartridge being operative to balance air pressures inside and outside the cartridge.

14. The environmentally controlled cartridge as recited in claim 13, wherein the breather further comprises:
   a diffusion limited access hole to limit moist air leakage to a predetermined level;
   a filter affixable to the breather access hole being operative to prevent particles from entering the cartridge; and
   a pollutant getter affixable to the breather access hole operative to trap chemical pollutants prior to entering the cartridge.

15. The environmentally controlled cartridge as recited in claim 1, wherein the seal further comprises:
   a door hingedly affixable to the opening of the second chamber whereby the door pivots to close the opening of the second chamber to protect the desiccant when the first chamber is open for data storage media access.

16. The environmentally controlled cartridge as recited in claim 1, wherein the seal further comprises:
   a door slidably engageable with respect to the opening of the second chamber whereby the door closes the opening of the second chamber to protect the desiccant when the first chamber is open for data storage media access.

17. The environmentally controlled cartridge as recited in claim 1, wherein the seal further comprises:
   a door rotationally engageable with respect to the opening of the second chamber whereby the door closes the opening of the second chamber to protect the desiccant when the first chamber is open for data storage media access.

18. An environmentally controlled cartridge for protecting data storage media therein from disallowed humidity and chemical pollutant levels comprising:
   a closed cartridge structure defining a first chamber openable to ambient and adapted to contain the data storage media and a second chamber adapted to contain means to control humidity and chemical pollutants in the first chamber; and
   means to communicate the first chamber with the second chamber when the first chamber is not open to ambient; and
   means to block communication between the first chamber and the second chamber when the first chamber is open to the ambient.

19. An environmentally controlled cartridge for protecting data storage media therein from disallowed chemical pollutant levels comprising:
   a closed cartridge structure having a first chamber openable for data storage media access and a second chamber having an opening in communication with the first chamber;
   a pollutant getter in communication with the second chamber to trap chemical pollutants out of air within the cartridge; and
   a seal moveably affixable with respect to the opening of the second chamber, and operative to close the communication of the second chamber with the first chamber when the first chamber of the cartridge is open for data storage media access so that the pollutant getter is protected from the environment outside the cartridge.

20. The environmentally controlled cartridge of claim 19 further comprising a charged desiccant in communication with the second chamber to control the humidity inside the closed cartridge structure.

21. The environmentally controlled cartridge as recited in claim 19, wherein the seal of the second chamber is actuated by a linkage to drive access elements within the first chamber.

22. The environmentally controlled cartridge as recited in claim 19, wherein the seal of the second chamber is actuated by a linkage to a cartridge insertion detection means.

23. The environmentally controlled cartridge as recited in claim 19, wherein the pollutant getter is activated charcoal.

24. The environmentally controlled cartridge as recited in claim 19, wherein the data storage media is magnetic tape.

25. The environmentally controlled cartridge as recited in claim 19, wherein the seal further comprises:
   a door rotationally engageable with respect to the opening of the second chamber whereby the door closes the opening of the second chamber to protect the pollutant getter when the first chamber is open for data storage media access.

26. The environmentally controlled cartridge as recited in claim 19 wherein the pollutant getter is disposed inside of the second chamber to trap chemical pollutants out of the air within the cartridge.

27. The environmentally controlled cartridge as recited in claim 19, wherein the seal of the second chamber has a first position that optimizes airflow with the first chamber.

28. The environmentally controlled cartridge as recited in claim 19, wherein the seal of the second chamber has a second position that optimizes the restriction of airflow with the first chamber.

29. The environmentally controlled cartridge as recited in claim 19, wherein the seal further comprises:
   a door hingedly affixable to the opening of the second chamber whereby the door pivots to close the opening of the second chamber to protect the pollutant getter when the first chamber is open for data storage media access.

30. The environmentally controlled cartridge as recited in claim 19, wherein the seal further comprises:
   a door slidably engageable with respect to the opening of the second chamber whereby the door closes the opening of the second chamber to protect the pollutant getter when the first chamber is open for data storage media access.

31. An environmentally controlled cartridge for protecting data storage media therein from disallowed humidity levels, comprising:

a closed cartridge structure having a first chamber openable for data storage media access and a second chamber having an opening in communication with the first chamber;

a charged desiccant in communication with the second chamber, to control the humidity level inside the closed cartridge structure;

a seal moveably affixable with respect to the opening of the second chamber, and operative to close the communication of the second chamber with the first chamber when the first chamber of the cartridge is open for data storage media access so that the charged desiccant is protected from the environment outside the cartridge.

32. The environmentally controlled cartridge as recited in claim 31, wherein the seal further comprises:

a door rotationally engageable with respect to the opening of the second chamber whereby the door closes the opening of the second chamber to protect the desiccant when the first chamber is open for data storage media access.

33. The environmentally controlled cartridge as recited in claim 31, wherein the charged desiccant is disposed inside of the second chamber to control the humidity level of cartridge air inside the cartridge.

34. The environmentally controlled cartridge as recited in claim 31, wherein the seal of the second chamber is actuated by a linkage to drive access elements within the first chamber.

35. The environmentally controlled cartridge as in claim 31, wherein the seal of the second chamber is actuated by a linkage to a cartridge insertion detection means.

36. The environmentally controlled cartridge as recited in claim 31, wherein the desiccant is selected from the group consisting of silica gel, calcium aluminosilicate clay, and crystalline metal aluminosilicates.

37. The environmentally controlled cartridge as recited in claim 31, wherein the data storage media is magnetic tape.

38. The environmentally controlled cartridge as recited in claim 31, wherein the seal further comprises:

a door hingedly affixable to the opening of the second chamber whereby the door pivots to close the opening of the second chamber to protect the desiccant when the first chamber is open for data storage media access.

39. The environmentally controlled cartridge as recited in claim 31, wherein the seal further comprises:

a door slidably engageable with respect to the opening of the second chamber whereby the door closes the opening of the second chamber to protect the desiccant when the first chamber is open for data storage media access.

40. The environmentally controlled cartridge as recited in claim 31, wherein the seal of the second chamber has a first position that optimizes airflow with the first chamber.

41. The environmentally controlled cartridge as recited in claim 31, wherein the seal of the second chamber has a second position that optimizes the restriction of airflow with the first chamber.

* * * * *